United States Patent
Li et al.

(10) Patent No.: US 11,336,593 B2
(45) Date of Patent: May 17, 2022

(54) DATA LINK LAYER DEVICE AND PACKET ENCAPSULATION METHOD THEREOF

(71) Applicant: Shanghai Zhaoxin Semiconductor Co., Ltd., Shanghai (CN)

(72) Inventors: Ranyue Li, Shanghai (CN); Jie Jin, Shanghai (CN); Junping Li, Shanghai (CN)

(73) Assignee: Shangahi Zhaoxin Semiconductor Co., Ltd., Shanghai (CN)

( * ) Notice: Subject to any disclaimer, the term of this patent is extended or adjusted under 35 U.S.C. 154(b) by 0 days.

(21) Appl. No.: 17/033,958

(22) Filed: Sep. 28, 2020

(65) Prior Publication Data

US 2022/0070120 A1   Mar. 3, 2022

(30) Foreign Application Priority Data

Aug. 31, 2020 (CN) .......................... 202010899772.9

(51) Int. Cl.
| | |
|---|---|
| *H04L 49/901* | (2022.01) |
| *H04L 49/90* | (2022.01) |
| *H04L 69/22* | (2022.01) |
| *H04L 12/18* | (2006.01) |
| *H04L 1/18* | (2006.01) |
| *H04L 12/46* | (2006.01) |

(52) U.S. Cl.
CPC .......... *H04L 49/901* (2013.01); *H04L 1/1874* (2013.01); *H04L 12/1868* (2013.01); *H04L 12/4633* (2013.01); *H04L 49/9042* (2013.01); *H04L 49/9094* (2013.01); *H04L 69/22* (2013.01)

(58) Field of Classification Search
CPC ... H04L 49/90; H04L 49/901; H04L 49/9094; H04L 49/9042; H04L 49/9047; H04L 1/1874; H04L 12/4633; H04L 12/1868
See application file for complete search history.

(56) References Cited

U.S. PATENT DOCUMENTS

| 6,076,115 A * | 6/2000 | Sambamurthy ......... H04L 29/06 709/224 |
| 2003/0169756 A1* | 9/2003 | Scholten ............. H04L 12/4604 370/412 |
| 2006/0291464 A1* | 12/2006 | Primrose ................ H04L 49/30 370/389 |

* cited by examiner

*Primary Examiner* — Mohamed A Kamara
(74) *Attorney, Agent, or Firm* — JCIPRNET

(57) ABSTRACT

A data link layer device and a packet encapsulation method are provided. The data link layer device includes a first and a second first-in-first-out (FIFO) module. The first FIFO module receives and stores multiple first data from an upper-layer module, and removes data gaps from the first data to store the first data in a continuous form. When the first FIFO module is not empty, the first FIFO module generates data of different lengths based on the current amount of data stored temporarily in the first FIFO module and a preset data length. When the data queue of the second FIFO module has enough space to receive the first data, the first FIFO module transfers the first data to the second FIFO module, and the first FIFO module transfers a header including the data length to a header queue of the second FIFO module.

24 Claims, 6 Drawing Sheets

DATA LINK LAYER DEVICE AND PACKET ENCAPSULATION METHOD THEREOF

CROSS-REFERENCE TO RELATED APPLICATION

This application claims the priority benefit of China application no. 202010899772.9, filed on Aug. 31, 2020. The entirety of the above-mentioned patent application is hereby incorporated by reference herein and made a part of this specification.

BACKGROUND

Technical Field

The disclosure is applied to the field of point-to-point protocols, and particularly relates to a data link layer device and a packet encapsulation method thereof.

Description of Related Art

In the point-to-point protocol of the data link layer, data of different lengths are usually encapsulated and/or assembled to generate a link layer packet for transmission. A typical link layer packet includes a header, data, a check code, a frame start, a frame end, etc. However, since the length of the data transmitted from the upper module and received by the data link layer may be different from one another, it is a matter of performance for the data link layer to encapsulate/assemble and transmit the data of different lengths properly. For example, in the case of transmitting the same valid data of the upper-layer module, the longer the valid data contained in a link layer packet is, the less total number of link layer packets to be transmitted tends to be, and the total amount of auxiliary information—such as headers, check codes, frame starts, frame ends, etc.—is also less, thereby improving the transmission efficiency. However, due to reasons like timing closure or chip area, the amount of data received and processed per clock cycle is limited. If a long link layer packet is to be encapsulated at this time, it takes more time to delay to collect a large amount of data. Therefore, the length of a link layer packet generally is given an upper limit to prevent the delay from being too long. Hence, it is the key of data link layer encapsulation to strike the balance between delay and transmission efficiency. In light of the above, the disclosure provides a data link layer device and a packet encapsulation method thereof, which implement multiple long link layer packets without increasing the delay, reduce transmission of auxiliary information, and improve the transmission efficiency.

SUMMARY

The disclosure is directed to a data link layer device and a packet encapsulation method thereof, which may provide an efficient encapsulating mechanism for the data link layer.

According to an embodiment of the disclosure, the data link layer device includes a first first-in first-out (FIFO) module and a second FIFO module. The first FIFO module is adapted for storing multiple first data. The second FIFO module is coupled to the first FIFO module. The first FIFO module receives and stores the multiple first data transferred from an upper-layer module, and removes the data gap from the multiple first data such that the first FIFO module may store the first data in a continuous form. When the first FIFO module is not empty, the first FIFO module generates data of different lengths based on the current amount of data stored temporarily in the first FIFO module and the preset data length. When the data queue of the second FIFO module has enough space to receive the multiple first data, the first FIFO module transfers the multiple first data to the second FIFO module, and the first FIFO module transfers the header including the data length to the header queue of the second FIFO module.

According to an embodiment of the disclosure, the packet encapsulation method includes the following steps: storing, by a first FIFO module, multiple first data; coupling a second FIFO module to the first FIFO module; receiving and storing, by the first FIFO module, the multiple first data transferred from an upper-layer module, and removing data gaps from the multiple first data such that the first FIFO module may store the first data in a continuous form; when the first FIFO module is not empty, generating, by the first FIFO module, data of different lengths based on the current amount of data stored temporarily in the first FIFO module and the preset data length; and when the data queue of the second FIFO module has enough space to receive the multiple first data, transferring, by the first FIFO module, the multiple first data to the second FIFO module, and transferring, by the first FIFO module, the header including the data length to the header queue of the second FIFO module.

Based on the above, it is by first accumulating multiple first data by the first FIFO module before transferring the multiple first data to the second FIFO module by the first FIFO module when the data queue in the second FIFO module has enough space that the second FIFO module may store the second data having a longer length of valid data, so that the data link layer device and the encapsulation method of the disclosure may well prevent the second FIFO module from performing inefficient encapsulation by transmitting data having a shorter data length multiple times to a backend module.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

To make the purpose, features, and advantages of the disclosure more comprehensible, several specific embodiments accompanied with drawings are described in detail as follows. In the present specification and claims, it is the criterion for distinguishment that different elements and components are not distinguished by different names but by different functions.

Figure 1:
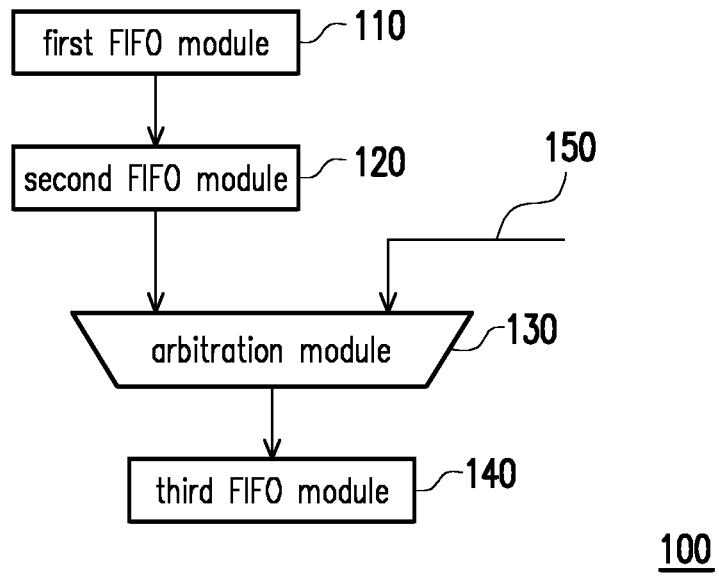
FIG. 1 is a block diagram of a data link layer device according to an embodiment of the disclosure.

FIG. 1 is a block diagram of a data link layer device according to an embodiment of the disclosure. In FIG. 1, the data link layer device 100 includes a first first-in first-out (FIFO) module 110, a second FIFO module 120, an arbitration module 130, and a third FIFO module 140. The first FIFO module 110 is coupled to the second FIFO module 120. The second FIFO module 120 is coupled to the arbitration module 130. The arbitration module 130 is coupled to the third FIFO module 140. In the present embodiment, the data link layer device 100 is, for example, applied to the node-to-node data transmission in the interconnection platform of the public key exchange (PKE) protocol, and the data link layer device 100 also includes related arithmetic logic circuits which may be adapted to implement relevant calculation and judgment of the embodiments of the disclosure. In the present embodiment, the first FIFO module 110, the second FIFO module 120, and the third FIFO module 140 may each include, for example, a data buffer and other related circuits such as a data-transmission circuit, a control circuit, etc. as parts of the configuration. In the present embodiment, the first FIFO module 110 is used to receive multiple first data provided by the protocol layer, and the data lengths of the multiple first data may be the same or different from one another. The arbitration module 130 may determine whether to send the data of the second FIFO module 120 to the third FIFO module 140 based on the arbitration application of the second FIFO module 120. The arbitration module 130 may also receive other data 150 of the node which participates in arbitration, such as acknowledge character (ACK), negative acknowledgment (NAK), and other data from the Internet platform, and the disclosure is not limited thereto.

Figure 2:
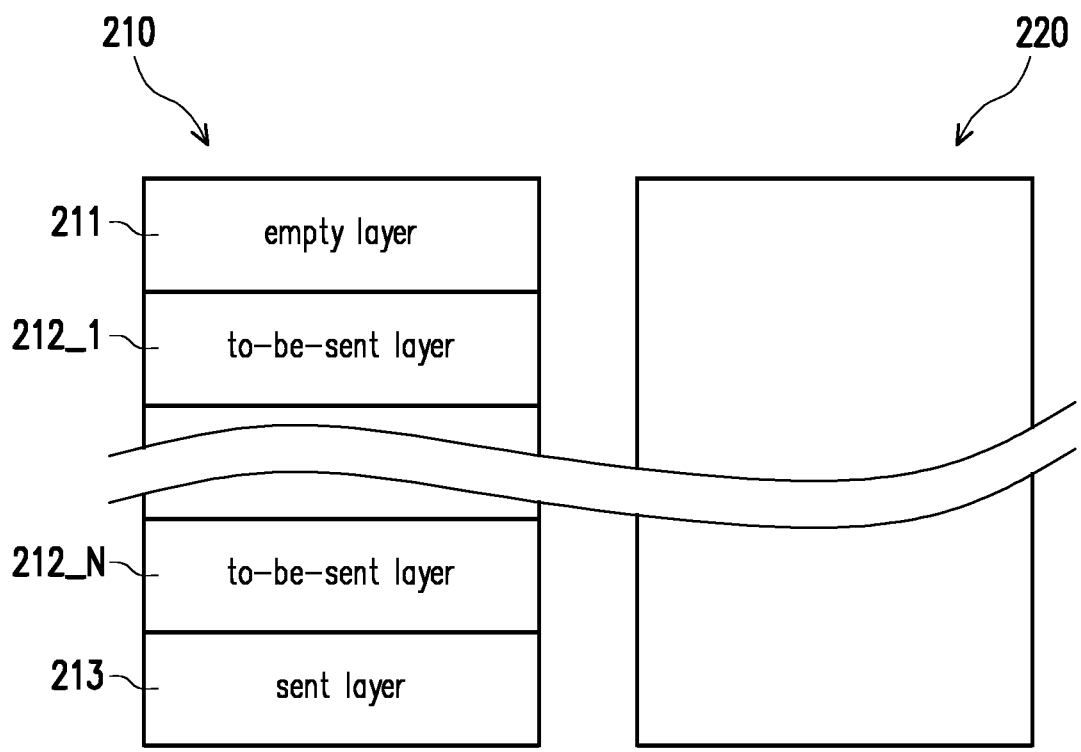
FIG. 2 is a block diagram of a data queue and a header queue of a second FIFO module according to an embodiment of the disclosure.

FIG. 2 is a block diagram of a data queue and a header queue of a second FIFO module according to an embodiment of the disclosure. In FIG. 1 to FIG. 2, the second FIFO module 120 includes a header queue 210 and a data queue 220. The header queue 210 may include an empty layer 211, to-be-sent layers 212_1 to 212_N, and a sent layer 213, in which N is a positive integer. In the present embodiment, the numbers of the empty layer 211 and the sent layer 213 are not limited to what is shown in FIG. 2. The empty layer 211 may be adapted to receive a header including the data length transmitted by the first FIFO module 110. The to-be-sent layers 212_1 to 212_N are adapted to store the headers waiting for the second FIFO module 120 to pass arbitration of the third FIFO module 140. The sent layer 213 is adapted to store the headers transmitted by the second FIFO module 120 to the third FIFO module 140. And when the second FIFO module 120 receives the confirmation signal transmitted by the corresponding node, the second FIFO module 120 releases the space of the sent layer 213 (that is, deleting the headers which have been transmitted already). Note that the header queue 210 is adapted to indicate the positions of the data to be transmitted and the transmitted data in the data queue 220. It should also be clarified that the data link layer packet is transmitted from one node to the next. And the next node is the corresponding node of the sending node. After the sending node receives the confirmation signal transmitted by the corresponding node, the sending node releases the data of the sent link layer packet. For example, as shown in FIG. 2, if the sent layer 213 receives the ACK signal transmitted by the corresponding node (not the third FIFO module as shown in in FIG. 1), the sent layer 213 releases the data of the sent link layer packet. If the sent layer 213 receives the NAK signal transmitted by the corresponding node, the sent layer 213 then resends the data of the sent link layer packet.

In the present embodiment, before the first FIFO module 110 transmits the multiple first data to the second FIFO module 120, the first FIFO module 110 may first removes the data gaps from the multiple first data such that the first FIFO module 110 may store the multiple first data in a continuous form, which enables the second FIFO module 120 to adopt a continuous form of data to store a second data composed of the multiple first data after the multiple first data is transferred to the second FIFO module 120. Furthermore, before transmitting the multiple first data to the second FIFO module 120, the first FIFO module 110 generates data of different lengths based on the data length that has been set. For example, the data length that has been set may be N bytes, 2N bytes, . . . , or M*N bytes, in which N bytes is the largest data size received by the first FIFO module 110 from the upper-layer module in each cycle, and M is an integer greater than 1. If the size of the data existing in the first FIFO module 110 is smaller than N bytes, the data length generated by the first FIFO module 110 is N bytes. If the size of the data existing in the first FIFO module 110 is greater than N bytes and less than 2N bytes, the data length generated by the first FIFO module 110 is N bytes; and if it is greater than 2N bytes and less than 3N bytes, it is set to be 2N bytes, and so on.

Next, the first FIFO module 110 first determines whether the data queue 220 of the second FIFO module 120 has enough space to receive the multiple first data as described above (the data length is N bytes, 2N bytes, . . . , or M*N bytes). When the data queue 220 of the second FIFO module 120 has enough space to receive the multiple first data as described above, the first FIFO module transfers the multiple first data to the second FIFO module 120, and the first FIFO module transfers the header including the data length to the header queue 210 of the second FIFO module 120. By contrast, when the data queue 220 of the second FIFO module 120 does not have enough space to receive the multiple first data, the first FIFO module 110 postpones temporarily the transmission of data to the second FIFO module 120, continues to receive data transferred from the upper-layer module, and generates the first data having a suitable length. Therefore, the first FIFO module 110 of the present embodiment does not transmit continuously the multiple first data having possibly shorter or different lengths to the second FIFO module 120. Instead, the first FIFO module 110 waits until the data queue 220 of the second FIFO module 120 has enough space for receiving before transmitting the data. In other words, the first FIFO module 110 may accumulate multiple first data before transmitting them altogether to the second FIFO module 120 without affecting the normal data transmission efficiency, which improves the transmission efficiency greatly. Note that the determination of whether the second FIFO module 120 has enough space and the calculation of the length of the generated data (the data length is N bytes, 2N bytes, . . . , or M*N bytes) may be implemented by adopting a logical algorithm, which may be accomplished by those skilled in the art, and the disclosure is not limited thereto.

Then, based on the second data, the second FIFO module 120 generates a header including a data length corresponding to the second data. The second FIFO module 120 first applies for arbitration to the arbitration module 130. After the second FIFO module 120 passes arbitration of the arbitration module 130, the second FIFO module 120 transmits the header and the second data to the third FIFO module 140, such that the third FIFO module 140 may encapsulate the data and generate a link layer packet based on the header and the second data. In other words, since the second data stored in the second FIFO module 120 is composed of the plurality of first data from which the data gaps are removed, the second data may have a longer data length to prevent the third FIFO module 140 from spending too much time in encapsulating data and generating packets, thereby improving effectively the efficiency of encapsulation.

In addition, note that the second FIFO module 120 of the present embodiment does not release the space immediately after transmitting the header and the second data to the third FIFO module 140. The second FIFO module may be, for example, a Retry FIFO module. After the second FIFO module 120 transmits the header and the second data to the third FIFO module 140 and the second FIFO module 120 receives the confirmation signal returned by the corresponding node, the second FIFO module 120 releases the space of the sent layer 213 in the header queue 210 for storing the header and the space of the data queue 220 for storing the second data. In contrast, when the second FIFO module 120 fails to transmit the data, the second FIFO module 120 may perform again the data-transmission operation based on the header. In the present embodiment, the third FIFO module 140 may generate a check code based on the current header and the current second data that have been transmitted, and add the check code with auxiliary information to generate a link layer packet.

Figure 3:
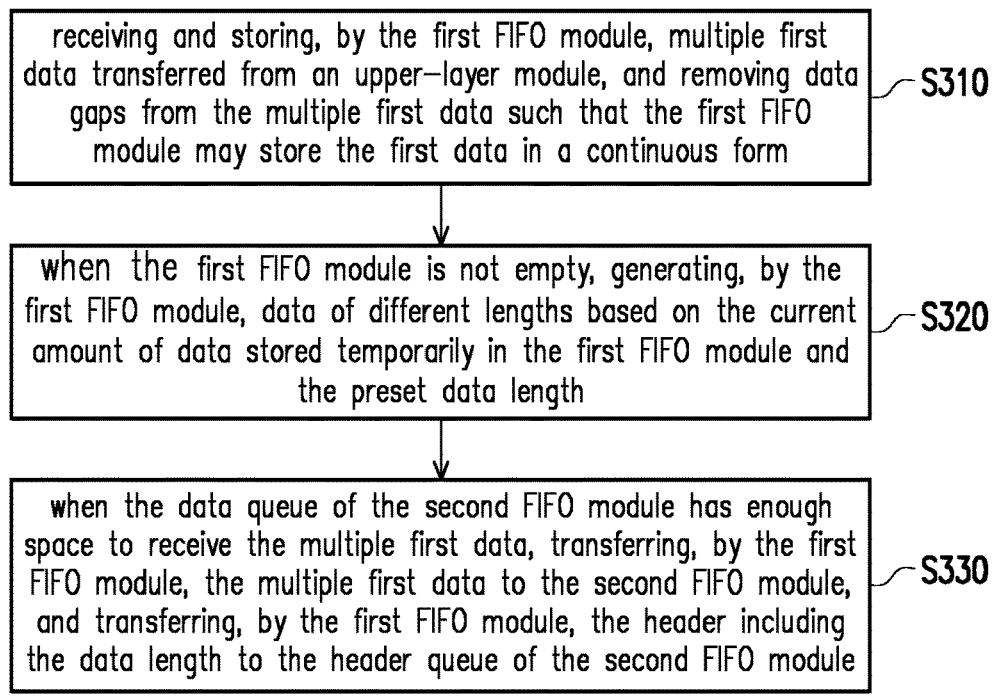
FIG. 3 is a flowchart of a packet encapsulation method of a data link layer device according to an embodiment of the disclosure.

FIG. 3 is a flowchart of a packet encapsulation method of a data link layer device according to an embodiment of the disclosure. In FIG. 1 to FIG. 3, the packet encapsulation method of the data link layer device of the disclosure may at least be adopted by the data link layer device 100 of the embodiment of FIG. 1. In step S310, a first FIFO module 110 receives and stores multiple first data transferred from an upper-layer module, and removes a data gap from the multiple first data to store the first data in a continuous form. In step S320, when the first FIFO module 110 is not empty, the first FIFO module 110 generates data of different lengths (the length of the data is N bytes, 2N bytes, . . . , or M*N bytes) based on the current amount of data stored temporarily in the first FIFO module 110 and the data length that has been set. In step S330, when a data queue 220 of a second FIFO module 120 has enough space to receive the multiple first data as described above, the first FIFO module 110 transfers the multiple first data to the second FIFO module 120, and the first FIFO module 110 transfers a header including a data length to the header queue 210 of the second FIFO module 120.

Therefore, the first FIFO module 110 of the data link layer device 100 that implements steps S310 to S330 may transfer the accumulated multiple first data to the data queue 220 of the second FIFO module 120 when the data queue 220 of the second FIFO module 120 has enough space, such that the data length of the second data transmitted by the second FIFO module 120 to the backend module may be increased effectively.

Figure 4:
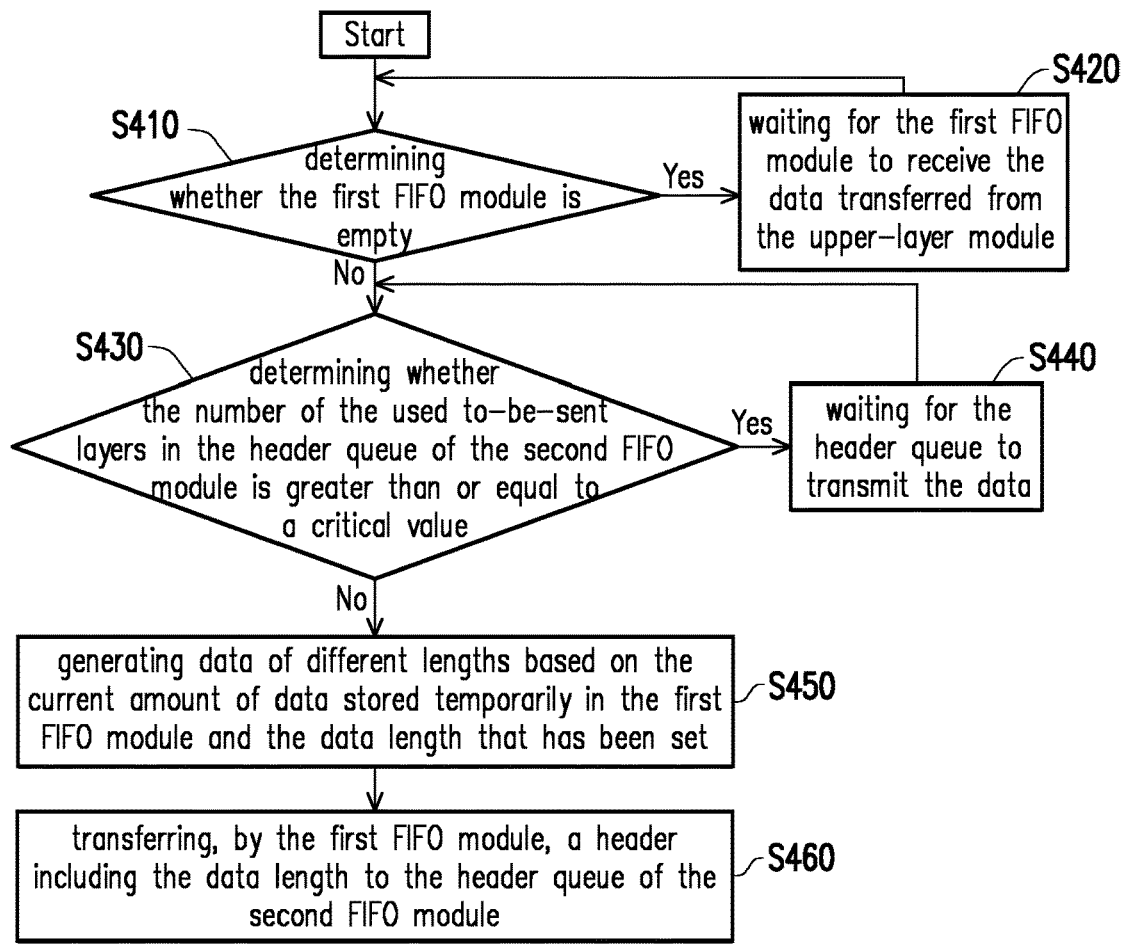
FIG. 4 is a flowchart of a header-transfer operation of a second FIFO module according to an embodiment of the disclosure.

FIG. 4 is a flowchart of a header-transfer operation of a header queue of a second FIFO module according to an embodiment of the disclosure. In FIG. 1, FIG. 2, and FIG. 4, the header-transfer operation of the second FIFO module of the present embodiment may at least be adopted by the data link layer device 100 of the embodiment of FIG. 1. In step S410, the first FIFO module 110 is determined to be empty or not. If yes, proceed to step S420, waiting for the first FIFO module 110 to receive the data transferred from the upper-layer module. If no, proceed to step S430, in which the first FIFO module 110 determines whether the number of the used to-be-sent layers 212_1 to 212_N in the header queue 210 of the second FIFO module 120 is greater than or equal to a critical value. If yes, proceed to step S440, waiting for the header queue 210 to transmit the data. If no, proceed to step S450, in which the first FIFO module 110 generates data of different lengths (the length of the data is N bytes, 2N bytes, . . . , or M*N bytes) based on the current amount of data stored temporarily in the first FIFO module 110 and the data length that has been set. In step S460, the first FIFO module 110 transfers a header including the data length to the header queue 210 of the second FIFO module 120.

Figure 6:
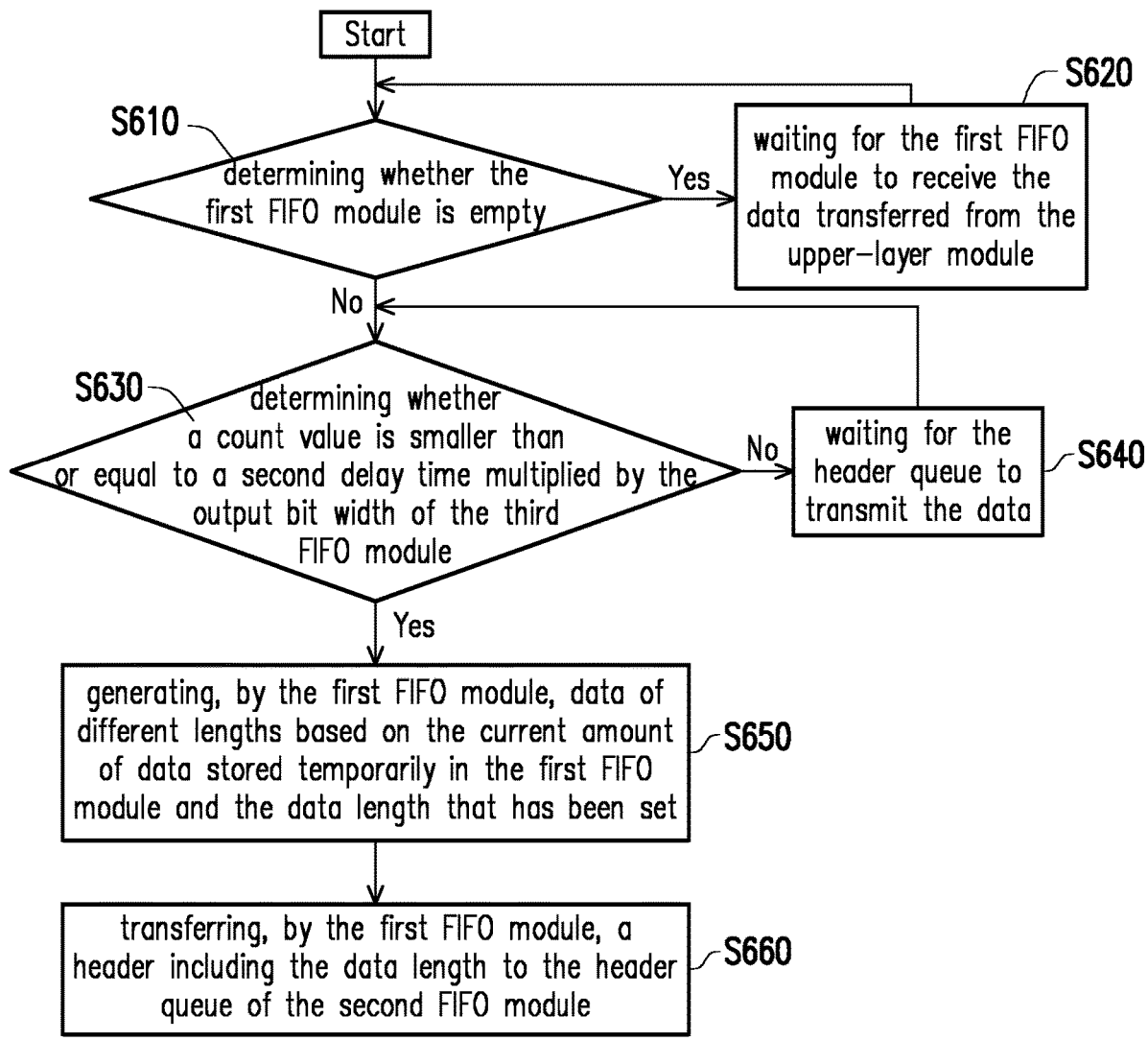
FIG. 6 is a flowchart of a header-transfer operation of a second FIFO module according to another embodiment of the disclosure.

In the present embodiment, it should be emphasized that the relation between the determined number of the used layers and the critical value in step S430 may satisfy the following Formula (1). In Formula (1), TH1 is the critical value. W is the number of times of transmission. T1 is a first delay time. The critical value TH1 multiplied by the number of times of transmission W is greater than or equal to the first delay time T1. The number of times of transmission W is the minimum number of times that the third FIFO module 140 transmits a link layer packet. The first delay time T1 is the period between the time when a header is transferred to the second FIFO module 120 and the time when the second FIFO module transmits the second data to the third FIFO module 140. In the present embodiment, the number of times of transmission W may satisfy the following Formula (2). In Formula (2), Lg is the minimum data length. L1 is the data length of the header. L2 is the data length of the check code and auxiliary information. D is the output bit width of the third FIFO module 140. The number of times of transmission W is equal to the minimum data length Lg plus the header data length L1 plus the data length L2 of the check code and the auxiliary information as a whole which is then divided by the output bit width D of the third FIFO module 140 and rounded down to an integer unconditionally. It is worth noting that, according to the above steps S410 to S460, in order to obtain a longer length of the second data which is stored in the data queue 220 of the second FIFO module 120, in one embodiment, the critical value TH1 may be configured to be as small as possible, but it must be ensured that the data transmission flow of the third FIFO module 140 is not interrupted when the data queue 220 of the second FIFO module 120 is not empty. In addition, in another embodiment, if the number of times of transmission W calculated in step S430 is not an integer, the data link layer device 100 may instead implement the following embodiment of FIG. 6, and the specific implementation of the embodiment of FIG. 6 is explained in detail below.

$$TH1 \times W \geq T1 \qquad \text{Formula (1)}$$

$$W=(Lg+L1+L2)/D \qquad \text{Formula (2)}$$

Accordingly, the first FIFO module 110 of the present embodiment may transmit some headers of the to-be-sent layers 212_1 to 212_N in the header queue 210 of the second FIFO module 120 to the third FIFO module 140 when the some headers pass arbitration, such that when the number of the used to-be-sent layers 212_1 to 212_N is smaller than the critical value, the first FIFO module 140 may immediately activate the data length calculation of headers. In other words, the first FIFO module 110 no longer generates data of different lengths (data length is N bytes, 2N bytes, . . . , or M*N bytes) based on the current amount of data stored temporarily in the first FIFO module 110 and the data length that has been set before simply transferring the data to the second FIFO module 120. Instead, the first FIFO module 110 determines whether to transfer the data to the second FIFO module 120 based on the state of the number of the layers used in the second FIFO module 120 (or the condition of the to-be-sent layers 212_1 to 212_N (to be arbitrated) and the sent layer 213 (to be arbitrated) in the second FIFO module 120). When the number of the layers used in the second FIFO module 120 is greater than or equal to the critical value TH1, it indicates that there are still some data to be transmitted in the second FIFO module 120 at this time, and thus the first FIFO module 110 temporarily stops generating data of different lengths (the data length is N bytes, 2N bytes, . . . , or M*N bytes), but waits for the second FIFO module 120 to transmit the data. When the number of the used layers in the second FIFO module 120 is smaller than the critical value TH1, it indicates that the transmission of the data is about to be completed and the ACK signal transmitted by the corresponding node is received by the second FIFO module 120. At this time, in order to ensure that there is no interruption in data transmission, it is necessary to activate the logic that calculates the generated data of different lengths (the data length is N bytes, 2N bytes, . . . , or M*N bytes), determine the data length (the data length is N bytes, 2N bytes, . . . , or M*N bytes) based on the current amount of data in the first FIFO module 110, and transmit the data to the second FIFO module 120. In light of the above, in the present embodiment, it is based on the determined state of used layers in the second FIFO module 120 to determine when the first FIFO module 110 may duly transmit data to the second FIFO module 120. With such configuration, the continuous flow of data transmission may be ensured, and the data link layer packets may also be encapsulated with longer valid data, which further improves the transmission efficiency.

Figure 5:
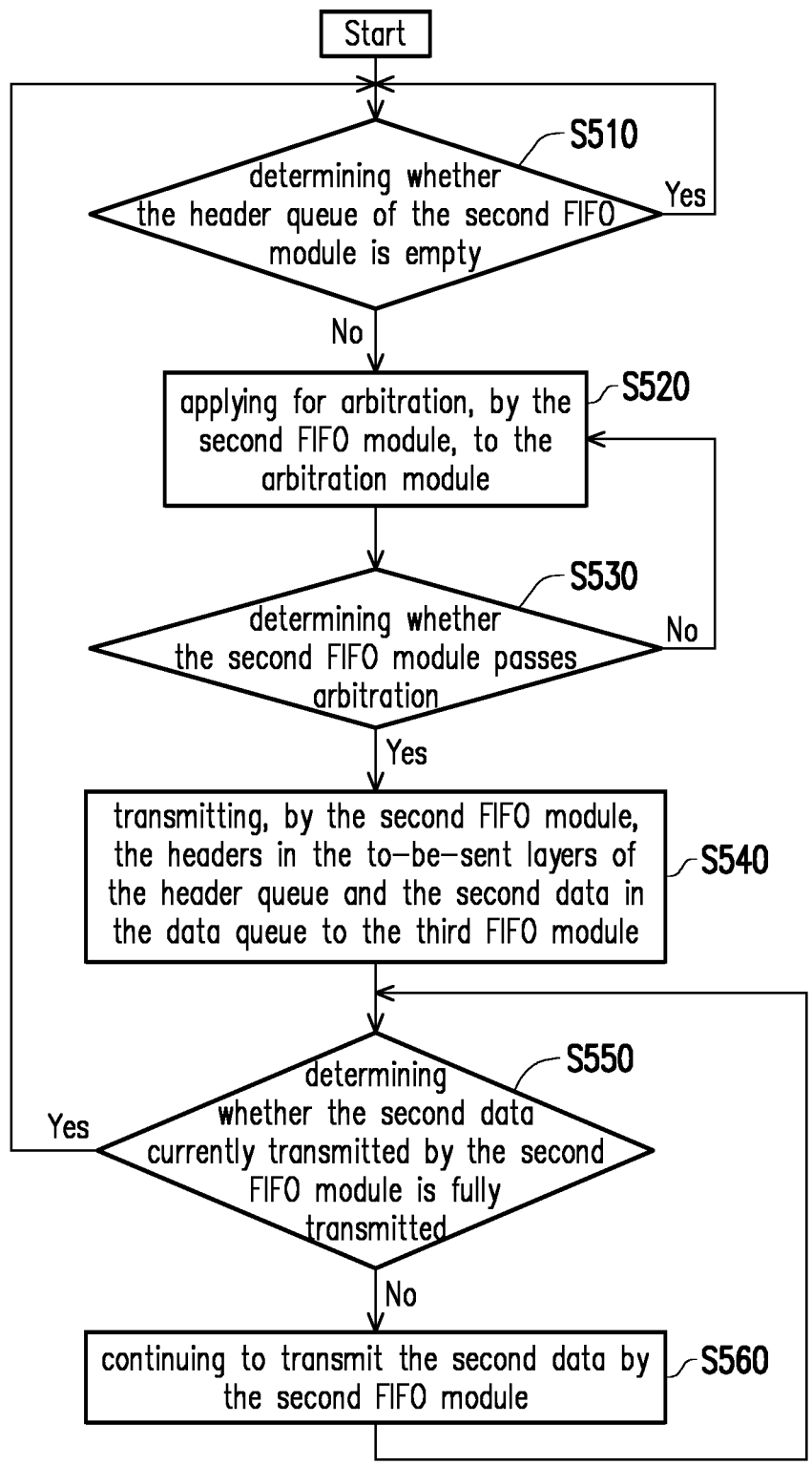
FIG. 5 is a flowchart of a data-transmission operation of a second FIFO module according to an embodiment of the disclosure.

FIG. 5 is a flowchart of a data-transmission operation of a second FIFO module according to an embodiment of the disclosure. In FIG. 1, FIG. 2, and FIG. 5, the data-transmission operation of a second FIFO module of the present embodiment may at least be adopted by the data link layer device 100 of the embodiment of FIG. 1, and may carry forward the process of the embodiment of FIG. 4 as described above. The second FIFO module performs the following steps S510 to S560 to perform the data-transmission operation. In step S510, the second FIFO module 120 determines whether the header queue 210 of the second FIFO module 120 is empty. If yes, wait for the header to be transferred to the header queue 210 by the first FIFO module 110, and perform step S510 again. If no, proceed to step S520, in which the second FIFO module 120 applies for arbitration to the arbitration module 130. In step S530, the second FIFO module 120 determines whether arbitration is passed. If no, the second FIFO module 120 waits for arbitration, and step S520 is performed again. If yes, proceed to step S540, in which the second FIFO module 120 transmits the headers in the to-be-sent layers 212_1 to 212_N of the header queue 210 and the second data in the data queue 220 to the third FIFO module 140. In step S550, the second FIFO module 120 determines whether the currently transmitted second data is fully transmitted to the third FIFO module 140. If no, proceed to step S560, in which the second FIFO module 120 continues to transmit the second data. If yes, perform step S510 again.

Therefore, when the header queue 210 of the second FIFO module 120 of the present embodiment is not empty, the second FIFO module 120 may apply for arbitration to the arbitration module 130. And due to the bit width limit between the second FIFO module 120 and the third FIFO module 140, the data corresponding to the data length recorded by a header may need to be transmitted from the second FIFO module 120 to the third FIFO module 140 multiple times. Moreover, when all the data in the data queue 220 of the second FIFO module 120 is fully transmitted, the second FIFO module 120 determines again whether the header queue 210 is empty.

FIG. 6 is a flowchart of a header-transfer operation of a header queue of a second FIFO module according to an embodiment of the disclosure. In FIG. 1, FIG. 2, and FIG. 6, the header-transfer operation of the second FIFO module of the present embodiment may at least be adopted by the data link layer device 100 of the embodiment of FIG. 1. In step S610, the first FIFO module 110 is determined to be empty or not. If yes, proceed to step S620, waiting for the first FIFO module 110 to receive the data transferred from the upper-layer module. If no, proceed to step S630, in which the first FIFO module 110 determines whether a count value is smaller than or equal to a second delay time multiplied by the output bit width of the third FIFO module 140. If no, proceed to step S640, waiting for the header queue 210 to transmit the data. If yes, proceed to step S650, in which the first FIFO module 110 generates data of different lengths (the length of the data is N bytes, 2N bytes, . . . , or M*N bytes) based on the current amount of data stored temporarily in the first FIFO module 110 and the data length that has been set. In step S660, the first FIFO module 110 transfers a header including the data length to the header queue 210 of the second FIFO module 120.

In the present embodiment, step S630 as described above may satisfy the following Formula (3). In Formula (3), CON is the count value. T2 is a second delay time. D is the output bit width of the third FIFO module 140. The count value CON is the amount of data of a link layer packet which is generated by the first FIFO module 110 and has passed arbitration of the arbitration module 130 to be transmitted from the third FIFO module 140. The second delay time T2 is the period between the time when a header is transferred to the second FIFO module 120 and the time when the third FIFO module 140 transmits the first piece of data.

$$CON \leq T2 \times D \qquad \text{Formula (3)}$$

Accordingly, the first FIFO module 110 of the present embodiment may transmit some headers in the to-be-sent layers 212_1 to 212_N of the header queue 210 of the second FIFO module 120 to the third FIFO module 140 when the some headers pass arbitration. And when Formula (3) as described above is satisfied, the first FIFO module 110 may know that the third FIFO module 140 is about to cut the flow so as to activate immediately the data length calculation of headers. FIG. 6 shows another embodiment of the disclosure that transmits data link layer packets having a data length as long as possible under the condition of implementing a continuous flow of data transmission, which is implemented by deciding when the first FIFO module 110 may duly transmit the data to the second FIFO module 120 based on the determined amount of data of a link layer packet encapsulated by the first FIFO module 110 and passes arbitration of the arbitration module 130 to be transmitted from the third FIFO module 140. With such configuration, the continuous flow of data transmission may be ensured, and the data link layer packets may also be encapsulated with longer valid data, which further improves the transmission efficiency. In addition, there is yet another embodiment which may also be implemented in combination with the embodiment of FIG. 4. In the present embodiment, step S630 may be combined with step S430 of the embodiment of FIG. 4. Specifically, in step S430 of the embodiment of FIG. 4, when the first FIFO module 110 determines that the calculated number of times of transmission W is not an integer, in order to determine more accurately the calculated data length and the time when to transfer the header, the first FIFO module 110 may further generate the aforementioned count value by a counter and perform the aforementioned step S630.

Figure 7:
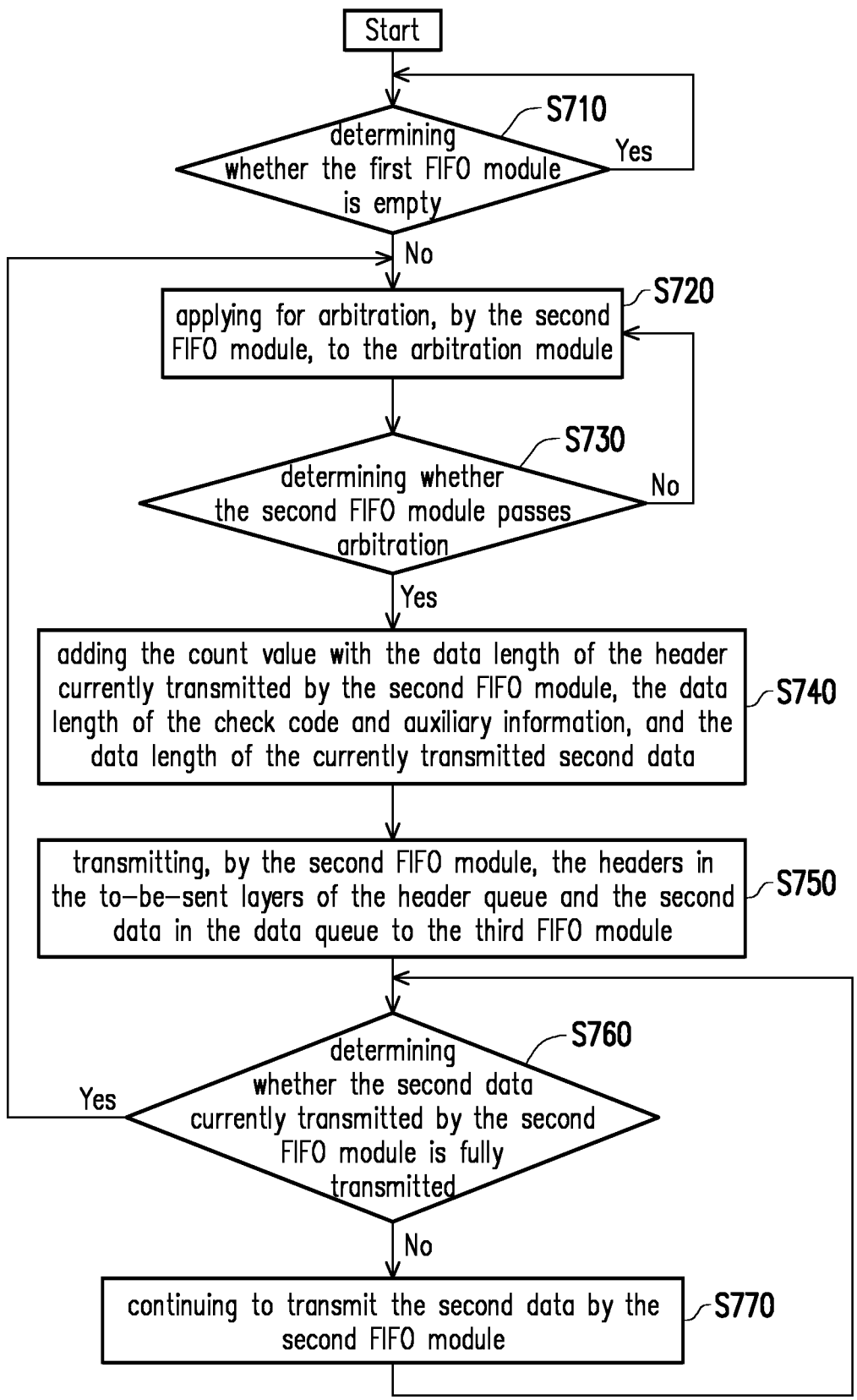
FIG. 7 is a flowchart of a data-transmission operation of a second FIFO module according to another embodiment of the disclosure.

FIG. 7 is a flowchart of a data-transmission operation of a second FIFO module according to another embodiment of the disclosure. In FIG. 1, FIG. 2, and FIG. 7, the data-transmission operation of a second FIFO module of the present embodiment may at least be adopted by the data link layer device 100 of the embodiment of FIG. 1, and may carry forward the process of the embodiment of FIG. 6, after which the second FIFO module performs steps S710 to S770 described as follows to perform the data-transmission operation. In step S710, the first FIFO module 110 is determined to be empty or not. If yes, wait for the first FIFO module 110 to receive the data transferred from the upper-layer module, and perform step S710 again. If no, proceed to step S720, in which the second FIFO module 120 applies for arbitration to the arbitration module 130. In step S730, the second FIFO module 120 determines whether arbitration is passed. If no, the second FIFO module 120 waits for arbitration, and step S720 is performed again. If yes, proceed to step S740, in which the first FIFO module 110 adds the count value with the data length of the header currently transmitted by the second FIFO module 120, the data length of the check code and auxiliary information, and the data length of the currently transmitted second data. In step S750, the second FIFO module 120 transmits the headers in the to-be-sent layers 212_1 to 212_N of the header queue 210 and the second data in the data queue 220 to the third FIFO module 140. In step S760, the second FIFO module 120 determines whether the currently transmitted second data is fully transmitted to the third FIFO module 140. If no, proceed to step S770, in which the second FIFO module 120 continues to transmit the second data. If yes, perform step S710 again.

Therefore, when the header queue 210 of the second FIFO module 120 of the present embodiment is not empty, the second FIFO module 120 may apply for arbitration to the arbitration module 130. And due to the bit width limit between the second FIFO module 120 and the third FIFO module 140, the data corresponding to the data length recorded by a header may need to be transmitted from the second FIFO module 120 to the third FIFO module 140 multiple times. Moreover, when all the data in the data queue 220 of the second FIFO module 120 is fully transmitted, the second FIFO module 120 determines again whether the header queue 210 is empty. In addition, the count value described in the present embodiment corresponds to the count value of the embodiment in FIG. 6 described above, and when the second FIFO module 120 passes arbitration, the count value increases automatically. Viewing from another perspective, since it is based on the count value of the data output by the third FIFO module 140 to determine whether a new header may be transferred to the second FIFO module 120 of the present embodiment, the data queue of the first FIFO module 110 may cache more data, such that the third FIFO module 140 may obtain more easily a link layer packet of longer data length, and may improve effectively the efficiency of encapsulation and transmission.

Figure 8:
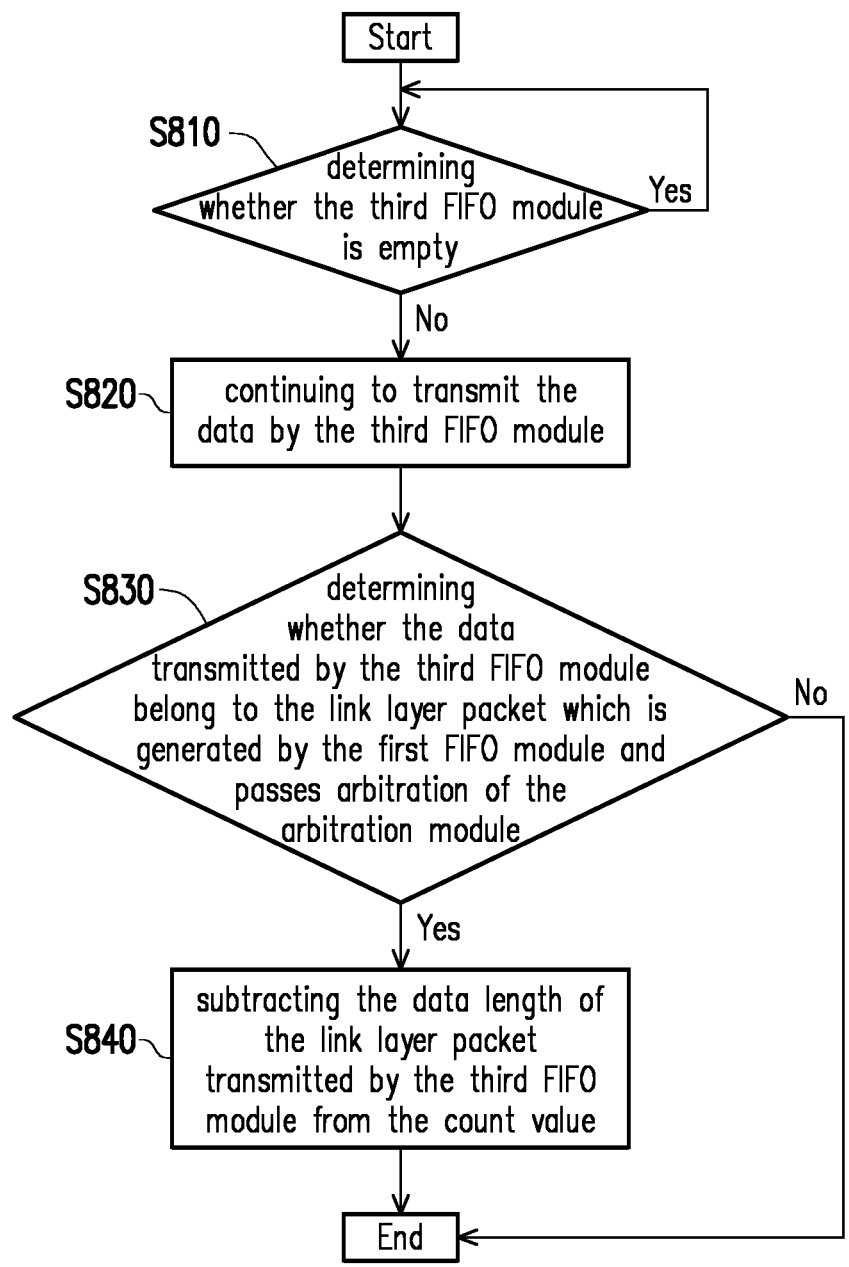
FIG. 8 is a flowchart of transmitting a link layer packet from a third FIFO module according to an embodiment of the disclosure.

FIG. 8 is a flowchart of a third FIFO module transmitting a link layer packet according to an embodiment of the disclosure. In FIG. 1, FIG. 2, and FIG. 8, the transmission of the link layer packet from the third FIFO module of the present embodiment may at least be adopted by the data link layer device 100 of the embodiment of FIG. 1, and may carry forward the process of the embodiment of FIG. 7, after which the second FIFO module performs steps S810 to S840 described as follows to transmit the link layer packet. In step S810, the third FIFO module 140 determines whether its data queue is empty. If yes, repeat step S810 and wait for the second FIFO module 120 to transmit the header and the second data to the third FIFO module 140. If no, proceed to step S820, in which the third FIFO module 140 transmits the data. In step S830, the first FIFO module 110 determines whether the sent data belong to the link layer packet which is generated by the first FIFO module 110 and passes arbitration of the arbitration module 130. If yes, proceed to step S840, in which the first FIFO module 110 subtracts the data length of the link layer packet transmitted by the third FIFO module 140 from the count value. Therefore, the third FIFO module 140 of the present embodiment may encapsulate efficiently data and transmit the link layer packets based on the header and the second data transmitted by the second FIFO module 120. In addition, the count value described in the present embodiment corresponds to the count value of the embodiment in FIG. 6 described above, and when the third FIFO module 140 transmits a layer link packet, the count value is deducted automatically.

In summary, the data link layer device and the packet encapsulation method of the disclosure may effectively postpone the timing of transferring the first data from the first FIFO module to the second FIFO module as well as the timing of transmitting the header and the second data from the second FIFO module to the third FIFO module, and may also allow the second FIFO module to send the headers and the second data to the third FIFO module in a continuous flow, such that the third FIFO module may encapsulate data and form link layer packets effectively based on longer continuous data, which improves greatly the efficiency of encapsulation and transmission.

Lastly, the above embodiments are only used to illustrate the technical solutions of the disclosure without limiting the disclosure; although the disclosure has been described in detail with reference to the foregoing embodiments, those of ordinary skill in the art should understand that they may still recombine or modify the technical solutions described in each of the foregoing embodiments, or substitute some or all of the technical features with their equivalence; and the entities of those corresponding technical solutions with such combinations, modifications, or substitutions do not deviate from the scope of the technical solutions of the embodiments of the disclosure.

What is claimed is:
1. A data link layer device, comprising:
 a first first-in-first-out (FIFO) module, when empty, receiving and storing a plurality of first data, and removing a data gap from the first data to store the first data in a continuous form; and a second FIFO module, coupled to the first FIFO module, wherein the first FIFO module determines whether a data queue of the second FIFO module is empty, wherein when the data queue of the second FIFO module is not empty, the first FIFO module determines whether a number of a used to-be-sent layer in a header queue of the second FIFO module is greater than or equal to a critical value, wherein when the number of the used to-be-sent layer is greater than or equal to the critical value, after finishing waiting for the header queue to perform data transmission, the first FIFO module determines again whether the number of the used to-be-sent layer is greater than or equal to the critical value, and wherein when the number of the used to-be-sent layer is smaller than the critical value, the first FIFO module generates data of different lengths based on a current amount of data stored temporarily in the first FIFO module and a data length that has been set, and the first FIFO module transfers a header comprising the data length to the header queue of the second FIFO module.

2. The data link layer device according to claim 1, wherein when the data queue of the second FIFO module is empty, the first FIFO module transfers the first data to the second FIFO module.

3. The data link layer device according to claim 1, further comprising:
an arbitration circuit, coupled to the second FIFO module; and
a third FIFO module, coupled to the arbitration circuit, wherein after the second FIFO module passes arbitration of the arbitration circuit, the second FIFO module transmits the header in the to-be-sent layer of the header queue and second data in the data queue to the third FIFO module.

4. The data link layer device according to claim 3, wherein the third FIFO module generates a check code based on the header and the second data which have been currently transmitted and adds the check code with auxiliary information to generate a link layer packet.

5. The data link layer device according to claim 4, wherein the critical value multiplied by a number of times of transmission is greater than or equal to a first delay time, wherein the number of times of transmission is a minimum number of times that the third FIFO module transmits one link layer packet, and the first delay time is a period between a time when the header is transmitted to the second FIFO module and a time when the second FIFO module transmits the second data to the third FIFO module.

6. The data link layer device according to claim 5, wherein the number of times of transmission is equal to a minimum data length plus the data length of the header plus a data length of the check code and the auxiliary information as a whole which is then divided by an output bit width of the third FIFO module.

7. The data link layer device according to claim 4, wherein when the data queue of the second FIFO module is not empty, the first FIFO module determines whether a count value is smaller than or equal to a second delay time multiplied by an output bit width of the third FIFO module, wherein when the count value is smaller than or equal to the second delay time multiplied by the output bit width of the third FIFO module, the first FIFO module generates the data of different lengths based on the current amount of data stored temporarily in the first FIFO module and the data length that has been set, and the first FIFO module transfers the header comprising the data length to the header queue of the second FIFO module, and wherein when the count value is greater than the second delay time multiplied by the output bit width of the third FIFO module, after finishing waiting for the header queue to perform data transmission, the first FIFO module determines again whether the count value is smaller than or equal to the second delay time multiplied by the output bit width of the third FIFO module.

8. The data link layer device according to claim 7, wherein the count value is an amount of data of the link layer packet which is generated by the first FIFO module and has passed arbitration of the arbitration circuit to be transmitted from the third FIFO module,
wherein the second delay time is a period between a time when the header is transmitted to the second FIFO module and a time when the third FIFO module transmits the first piece of data.

9. The data link layer device according to claim 8, wherein when the header queue of the second FIFO module is not empty, the second FIFO module applies for arbitration to the arbitration circuit, and after the second FIFO module passes arbitration, the second FIFO module transmits the header in the to-be-sent layer of the header queue and the second data in the data queue to the third FIFO module.

10. The data link layer device according to claim 9, wherein when the header queue of the second FIFO module is not empty, the count value is added with the data length of the header currently transmitted by the second FIFO module, a data length of the check code and the auxiliary information, and a data length of the currently transmitted second data.

11. The data link layer device according to claim 10, wherein when the third FIFO module transmits the link layer packet, a data length of the link layer packet transmitted by the third FIFO module is subtracted from the count value.

12. The data link layer device according to claim 3, wherein when the second FIFO module transmits the header and the second data to the third FIFO module and the second FIFO module receives a confirmation signal, the second FIFO module releases a space for storing the header in a sent layer of the header queue and a space for storing the second data in the data queue.

13. A packet encapsulation method for a data link layer device, comprising:
when a first first-in-first-out (FIFO) module is empty, receiving, by the first FIFO module, a plurality of first data from an upper-layer module, and removing a data gap from the first data such that the first FIFO module stores the first data in a continuous form;
determining, by the first FIFO module, whether a data queue of a second FIFO module is empty;
when the data queue of the second FIFO module is not empty, determining, by the first FIFO module, whether a number of a used to-be-sent layer in a header queue of the second FIFO module is greater than or equal to a critical value;
when the number of the used to-be-sent layer is greater than or equal to the critical value, after finishing waiting for the header queue to perform data transmission, determining again, by the first FIFO module, whether the number of the used to-be-sent layer is greater than or equal to the critical value; and
when the number of the used to-be-sent layer is smaller than the critical value, generating, by the first FIFO module, data of different lengths based on a current amount of data stored temporarily in the first FIFO module and a data length that has been set, and transferring, by the first FIFO module, a header comprising the data length to the header queue of the second FIFO module.

14. The packet encapsulation method according to claim 13, further comprising:
when the data queue of the second FIFO module is empty, transferring, by the first FIFO module, the first data to the second FIFO module.

15. The packet encapsulation method according to claim 13, further comprising:
after the second FIFO module passes arbitration of an arbitration module, transmitting, by the second FIFO module, the header in the to-be-sent layer of the header queue and second data in the data queue to a third FIFO module.

16. The packet encapsulation method according to claim 15, further comprising:
generating, by the third FIFO module, a check code based on the header and the second data which have been currently transmitted, and adding the check code with auxiliary information to generate a link layer packet.

17. The packet encapsulation method according to claim 16, wherein the critical value multiplied by a number of times of transmission is greater than or equal to a first delay time,
wherein the number of times of transmission is a minimum number of times that the third FIFO module transmits a link layer packet, and the first delay time is a period between a time when the header is transferred to the second FIFO module and a time when the second FIFO module transmits the second data to the third FIFO module.

18. The packet encapsulation method according to claim 17, wherein the number of times of transmission is equal to a minimum data length plus the data length of the header plus a data length of the check code and the auxiliary information as a whole which is then divided by an output bit width of the third FIFO module.

19. The packet encapsulation method according to claim 16, wherein when the data queue of the second FIFO module is not empty, a data length of the second data stored in the data queue of the second FIFO module is calculated, and the step of transferring the data length to the header queue of the second FIFO module comprises:
determining whether a count value is smaller than or equal to a second delay time multiplied by an output bit width of the third FIFO module;
when the count value is smaller than or equal to the second delay time multiplied by the output bit width of the third FIFO module, generating the data of different lengths based on the current amount of data stored temporarily in the first FIFO module and the data length that has been set;
transferring, by the first FIFO module, the header comprising the data length to the header queue of the second FIFO module; and
when the count value is greater than the second delay time multiplied by the output bit width of the third FIFO module, after finishing waiting for the header queue to perform data transmission, determining again whether the count value is smaller than or equal to the second delay time multiplied by the output bit width of the third FIFO module.

20. The packet encapsulation method according to claim 19, wherein the count value is an amount of data of the link layer packet which is generated by the first FIFO module and has passed arbitration of the arbitration module to be transmitted from the third FIFO module,
wherein the second delay time is a period between a time when the header is transferred to the second FIFO module and a time when the third FIFO module transmits the first piece of data.

21. The packet encapsulation method according to claim 20, further comprising:
when the header queue is not empty, applying for arbitration, by the second FIFO module, to the arbitration module; and
when the second FIFO module passes arbitration, transmitting, by the second FIFO module the header in the to-be-sent layer of the header queue and the second data in the data queue to the third FIFO module.

22. The packet encapsulation method according to claim 21, further comprising:
adding the count value with the data length of the header currently transmitted by the second FIFO module, a data length of the check code and the auxiliary information, and the data length of the currently transmitted second data.

23. The packet encapsulation method according to claim 22, further comprising:
when the third FIFO module transmits the link layer packet, a data length of the link layer packet transmitted by the third FIFO module is subtracted from the count value.

24. The packet encapsulation method according to claim 15, further comprising:
when the second FIFO module transmits the header and the second data to the third FIFO module and the second FIFO module receives a confirmation signal, releasing, by the second FIFO module, a space for storing the header in a sent layer of the header queue and a space for storing the second data in the data queue.

* * * * *